(12) United States Patent
Iwashita et al.

(10) Patent No.: US 8,058,827 B2
(45) Date of Patent: Nov. 15, 2011

(54) MOTOR CONTROL APPARATUS HAVING A FUNCTION TO CALCULATE AMOUNT OF COGGING TORQUE COMPENSATION

(75) Inventors: Yasusuke Iwashita, Yamanashi (JP); Tadashi Okita, Yamanashi (JP); Junichi Tezuka, Yamanashi (JP); Kazuyuki Sugiyama, Yamanashi (JP)

(73) Assignee: Fanuc Ltd, Yamanashi (JP)

(*) Notice: Subject to any disclaimer, the term of this patent is extended or adjusted under 35 U.S.C. 154(b) by 0 days.

(21) Appl. No.: 12/880,108

(22) Filed: Sep. 12, 2010

(65) Prior Publication Data

US 2011/0147028 A1 Jun. 23, 2011

(30) Foreign Application Priority Data

Dec. 22, 2009 (JP) ................. 2009-291051

(51) Int. Cl.
*B23Q 5/04* (2006.01)
(52) U.S. Cl. .............. 318/400.23; 318/432; 173/176
(58) Field of Classification Search ............. 173/2, 176, 173/180, 181; 318/400.23, 432, 700
See application file for complete search history.

(56) References Cited

U.S. PATENT DOCUMENTS

| | | | |
|---|---|---|---|
| 5,444,341 A * | 8/1995 | Kneifel et al. ........... | 318/432 |
| 2009/0251087 A1 | 10/2009 | Takei | |
| 2011/0084636 A1* | 4/2011 | Kyllingstad ............ | 318/400.23 |

FOREIGN PATENT DOCUMENTS

| | | |
|---|---|---|
| JP | 07-284286 A | 10/1995 |
| JP | 2005-224051 A | 8/2005 |
| JP | 2009061519 | 3/2009 |
| JP | 2009106069 | 5/2009 |
| WO | 2008108292 | 9/2008 |

* cited by examiner

*Primary Examiner* — Lindsay Low
(74) *Attorney, Agent, or Firm* — Lowe, Hauptman, Ham & Berner, LLP

(57) ABSTRACT

A motor control apparatus that can calculate a proper amount of cogging torque compensation even in cases where components due to other factors than cogging torque (for example, components due to gravitational torque, etc.) are superimposed on a torque command being output during constant slow-speed feed operation. The motor control apparatus includes: a torque command monitoring unit which monitors a torque command when the motor is caused to operate at a constant speed; an approximation calculation unit which calculates a torque command approximation component by approximation from the torque command monitored over an interval equal to an integral multiple of the cogging torque period of the motor; a second torque command calculation unit which calculates a second torque command by subtracting the torque command approximation component from the torque command; a second torque command frequency analyzing unit which extracts frequency components, each at an integral multiple of the fundamental frequency of the cogging torque, by performing frequency analysis on the thus calculated second torque command; and a cogging compensation amount calculation unit which calculates the amount of cogging compensation from the amplitude and phase of the extracted frequency components.

3 Claims, 10 Drawing Sheets

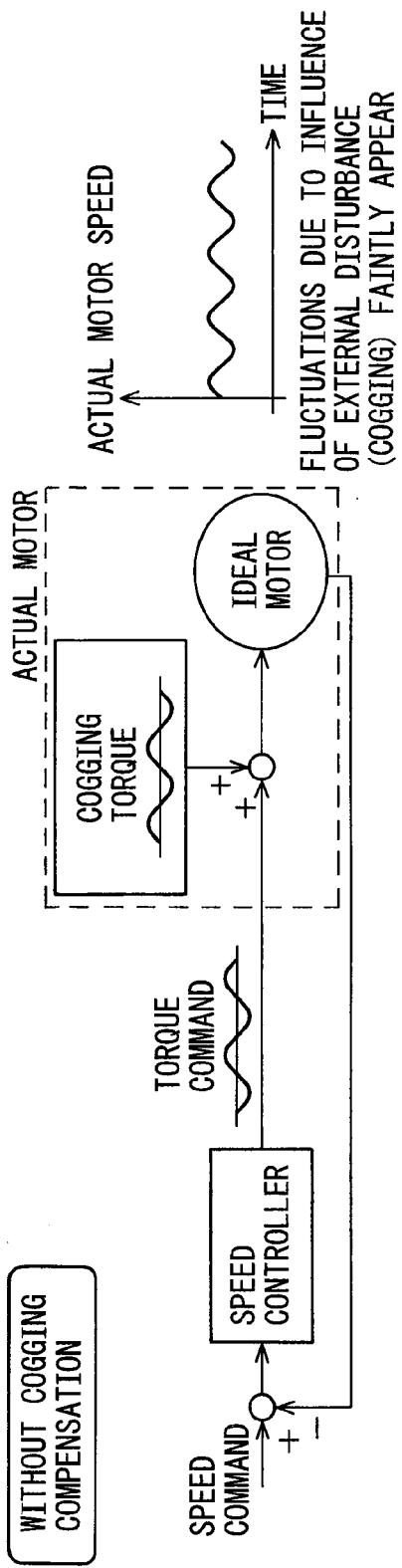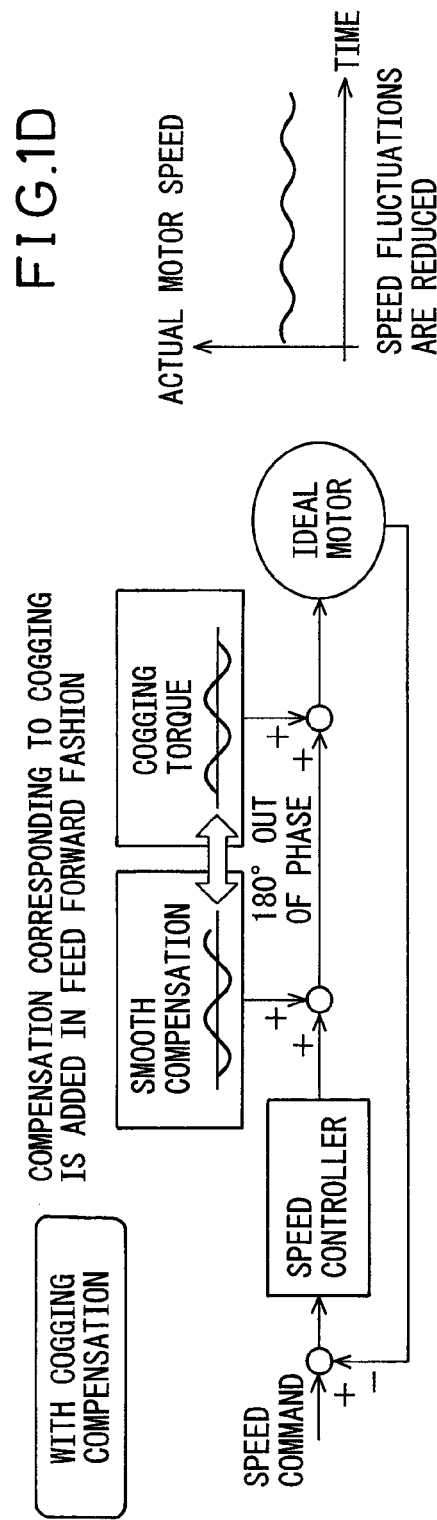

BEFORE COGGING COMPENSATION

AFTER COGGING COMPENSATION

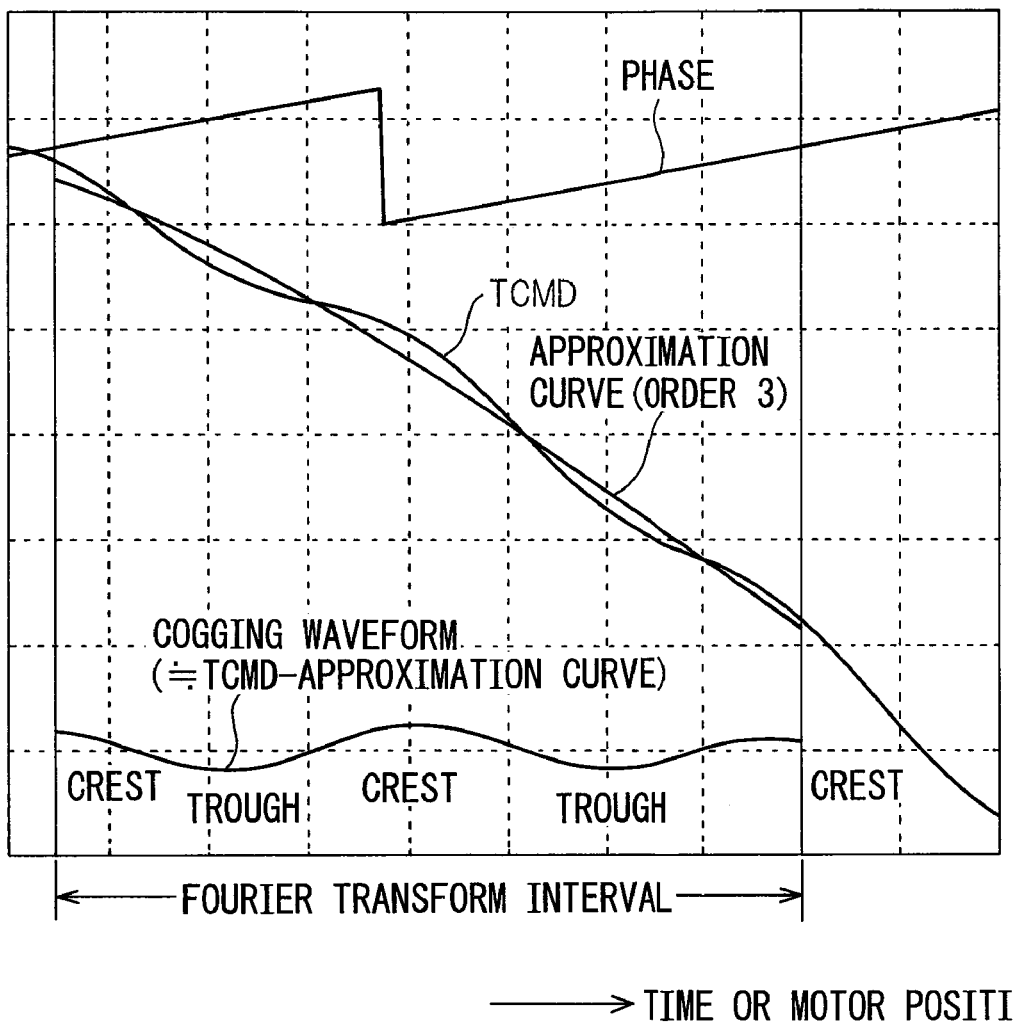

ORDER 2  ORDER 3  ORDER 4  ORDER 5

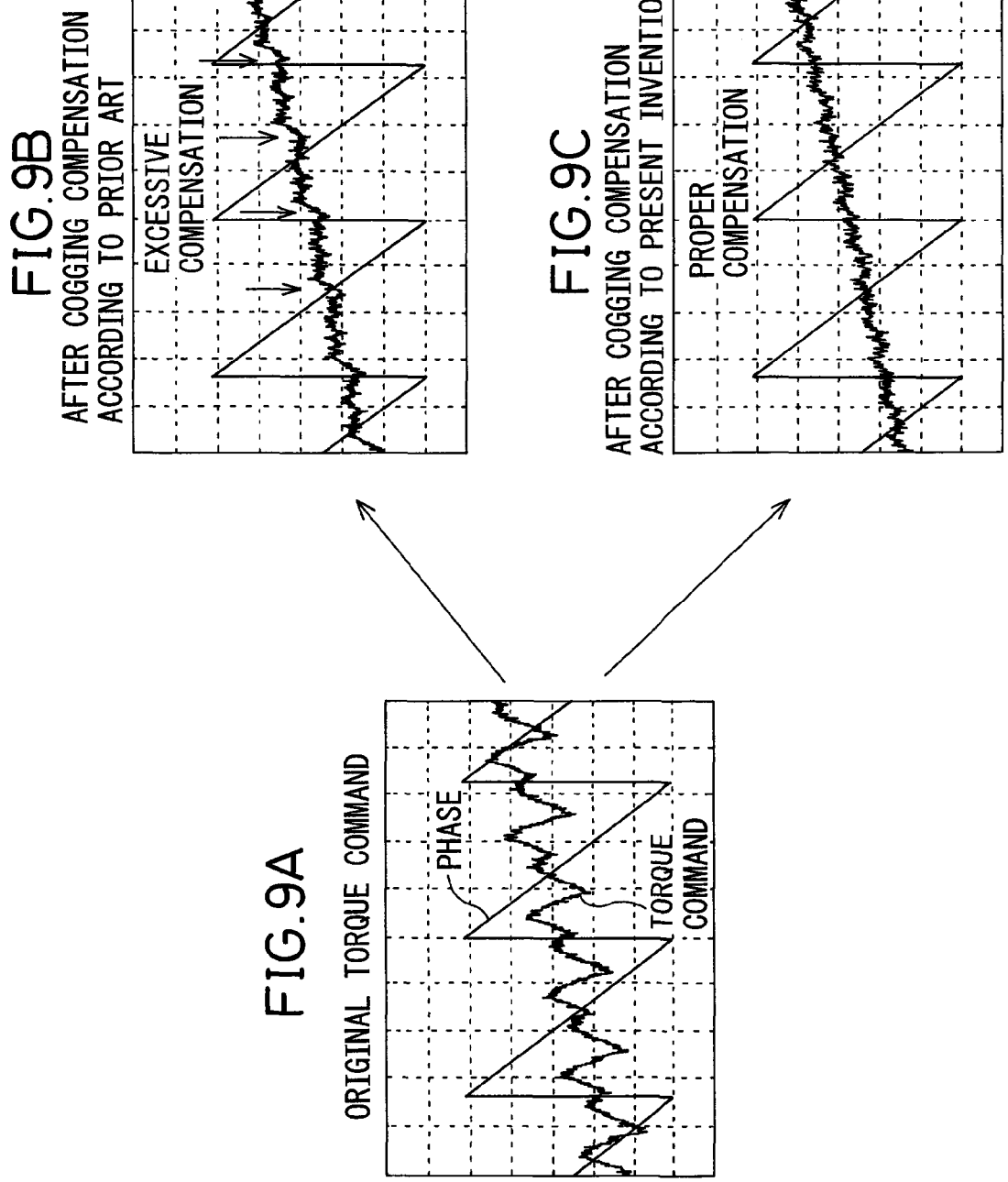

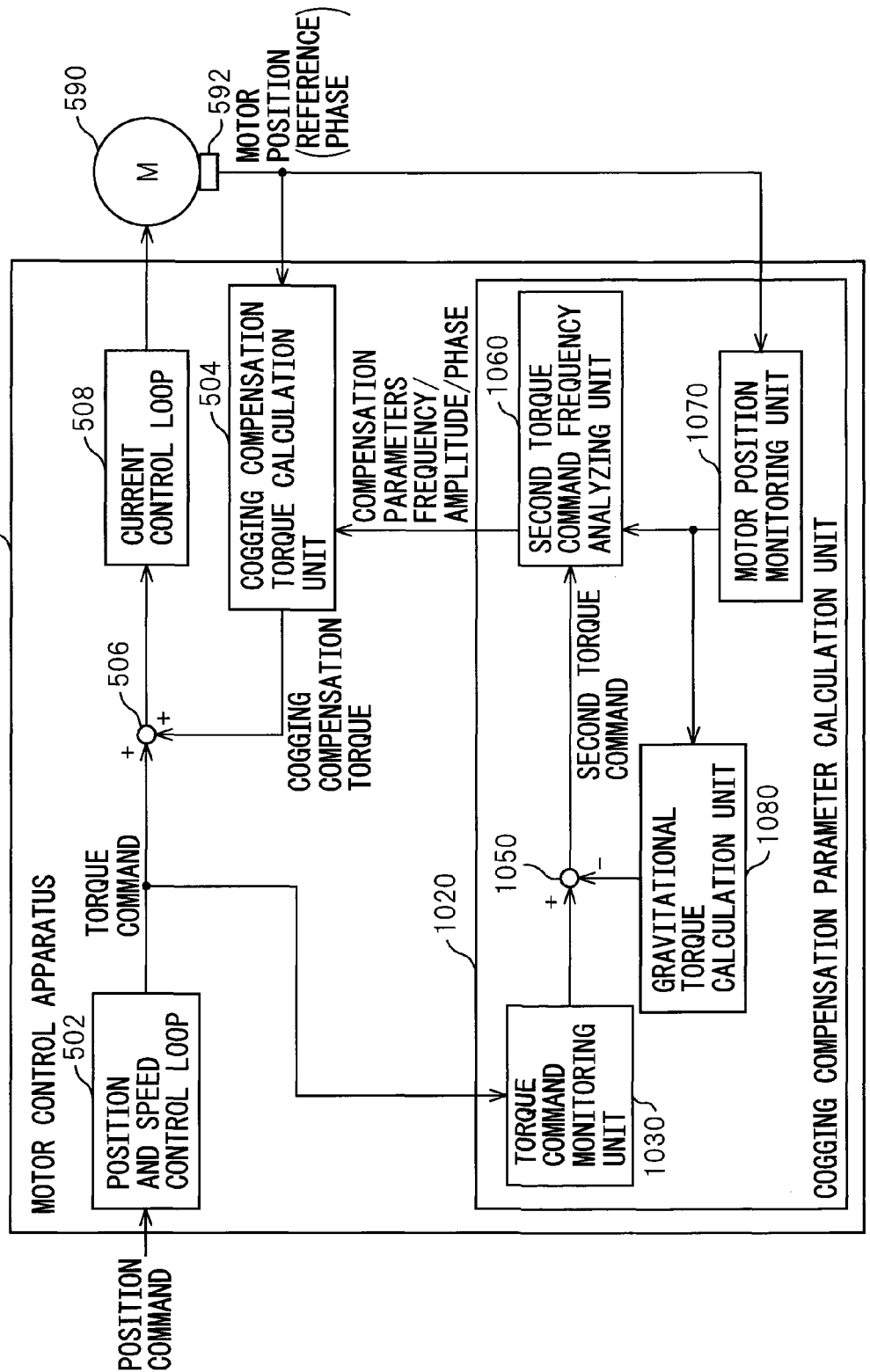

MOTOR CONTROL APPARATUS HAVING A FUNCTION TO CALCULATE AMOUNT OF COGGING TORQUE COMPENSATION

RELATED APPLICATIONS

The present application is based on, and claims priority from, Japanese Application Number 2009-291051, filed Dec. 22, 2009, the disclosure of which is hereby incorporated by reference herein in its entirety.

BACKGROUND OF THE INVENTION

1. Field of the Invention

The present invention relates to a motor control apparatus equipped with a function that corrects a torque command by calculating the amount of compensation for canceling out cogging torque which can cause an external disturbance in motor control (such a compensation will hereinafter be referred to as cogging torque compensation or cogging compensation).

2. Description of the Related Art

In recent years, the use of a direct-drive motor as a motor for driving the rotating axis of a machine tool has been increasing in order to meet the demand for higher speed and higher precision. Generally, in the case of an axis connected to a direct-drive motor, cogging compensation is applied in order to improve the smoothness of feed motion, since this type of motor produces a greater cogging torque than a conventional motor with a shaft. In the cogging compensation, the amount of compensation is calculated by performing frequency analysis on the torque command being output from a speed loop controller during constant slow-speed feed operation.

In the case of a feed axis in which the influence of gravity does not vary, the torque command being output during slow-speed feed operation is nearly constant and contains fluctuating components due only to the cogging torque; therefore, the amount of cogging compensation can be calculated by performing frequency analysis on the torque command.

On the other hand, in the case of an axis that causes a table to tilt, since the influence of gravity changes according to the tilt angle, the torque command being output during slow-speed feed operation is not constant but changes greatly according to the tilt angle. Since the torque command thus contains fluctuating components due to gravity, if frequency analysis is performed directly on the torque command, it is not possible to calculate the proper amount of cogging compensation.

In this way, there are cases where components due to other factors than cogging torque (for example, components due to gravitational torque, etc.) are superimposed on the torque command being output during constant slow-speed feed operation, and in such cases, there arises a problem that a proper amount of cogging compensation cannot be calculated if the frequency analysis is performed directly on the torque command. That is, if a component, such as a monotonically increasing or decreasing component are superimposed on the torque command, the proper amount of compensation cannot be obtained if the torque command is simply Fourier-transformed.

Patent document 1: Japanese Unexamined Patent Publication No. H07-284286
Patent document 2: Japanese Unexamined Patent Publication No. 2005-224051

SUMMARY OF THE INVENTION

The present invention has been devised in view of the above problem, and an object of the invention is to provide a motor control apparatus that can calculate proper amount of cogging torque compensation even in cases where components due to other factors than cogging torque (for example, components due to gravitational torque, etc.) are superimposed on a torque command being output during constant slow-speed feed operation.

To achieve the above object, according to a first aspect of the present invention, there is provided a motor control apparatus for controlling a motor used in a machine tool, comprising: a torque command monitoring unit which monitors a torque command when the motor is caused to operate at a constant speed; an approximation calculation unit which calculates a torque command approximation component by approximation from the torque command monitored by the torque command monitoring unit over an interval equal to an integral multiple of a cogging torque period of the motor; a second torque command calculation unit which calculates a second torque command by subtracting from the torque command monitored by the torque command monitoring unit the torque command approximation component calculated by the approximation calculation unit; a second torque command frequency analyzing unit which extracts frequency components, each at an integral multiple of a fundamental frequency of cogging torque, by performing frequency analysis on the second torque command calculated by the second torque command calculation unit; and a cogging compensation amount calculation unit which calculates the amount of cogging compensation from the amplitude and phase of the frequency components extracted by the second torque command frequency analyzing unit.

In the above-configured motor control apparatus, toque components other than the cogging torque are calculated by approximation, and the amount of cogging torque compensation is calculated using the waveform obtained by removing other components from the torque command.

According to a second aspect of the present invention, there is provided a motor control apparatus for controlling a motor used in a machine tool, comprising: a torque command monitoring unit which monitors a torque command when the motor is caused to operate at a constant speed; a motor position monitoring unit which monitors motor position; a gravitational torque calculation unit which calculates a gravitational torque component at each motor position monitored by the motor position monitoring unit; a second torque command calculation unit which calculates a second torque command by subtracting the gravitational torque component calculated by the gravitational torque calculation unit from the torque command monitored by the torque command monitoring unit over an interval equal to an integral multiple of a cogging torque period of the motor; a second torque command frequency analyzing unit which extracts frequency components, each at an integral multiple of a fundamental frequency of cogging torque, by performing frequency analysis on the second torque command calculated by the second torque command calculation unit; and a cogging compensation amount calculation unit which calculates the amount of cogging compensation from the amplitude and phase of the frequency components extracted by the second torque command frequency analyzing unit.

In the above-configured motor control apparatus, the gravitational torque component according to the motor position is calculated, and the amount of cogging torque compensation is calculated by using the waveform obtained by removing the gravitational torque component from the torque command.

According to the motor control apparatus of the present invention, since the proper amount of cogging torque compensation is calculated even in cases where components due to other factors than the cogging torque or components due to the gravitational torque are superimposed on the torque command being output during constant slow-speed feed operation, there is offered the effect that fluctuations in motor speed are reduced.

BRIEF DESCRIPTION OF THE DRAWINGS

Further features and advantages of the present invention will be apparent from the following description with reference to the accompanying drawings, in which:

FIGS. 1A, 1B, 1C, and 1D are diagrams for explaining a method of cogging compensation;

FIG. 7 is a waveform diagram showing by way of example a torque command waveform, an approximation curve, and a cogging waveform;

FIGS. 9A, 9B, and 9C are diagrams showing the original torque command waveform and the torque command waveform achieved by applying the cogging compensation according to the present invention, as compared with the torque command waveform achieved by applying the cogging compensation according to the prior art; and FIG. 10 is a block diagram schematically showing the configuration of a motor control apparatus according to a second embodiment of the present invention.

DETAILED DESCRIPTION

First, a description will be given of cogging compensation. FIGS. 1A, 1B, 1C, and 1D are diagrams explaining a method of cogging compensation. Since cogging torque can present an external disturbance in motor control, an actual motor operates by adding the cogging torque to the torque command given from a speed controller and by applying the result to an ideal motor, as illustrated in FIG. 1A. As a result, fluctuations due to the influence of the cogging torque as the external disturbance faintly appear in the actual motor speed, as illustrated in FIG. 1B. In the cogging compensation, the torque command is corrected by obtaining the amount of torque compensation in a 180° out of phase relationship with the cogging torque, as illustrated in FIG. 10. This cogging compensation serves to reduce fluctuations in the actual motor speed, as illustrated in FIG. 1D.

Figure 2A:
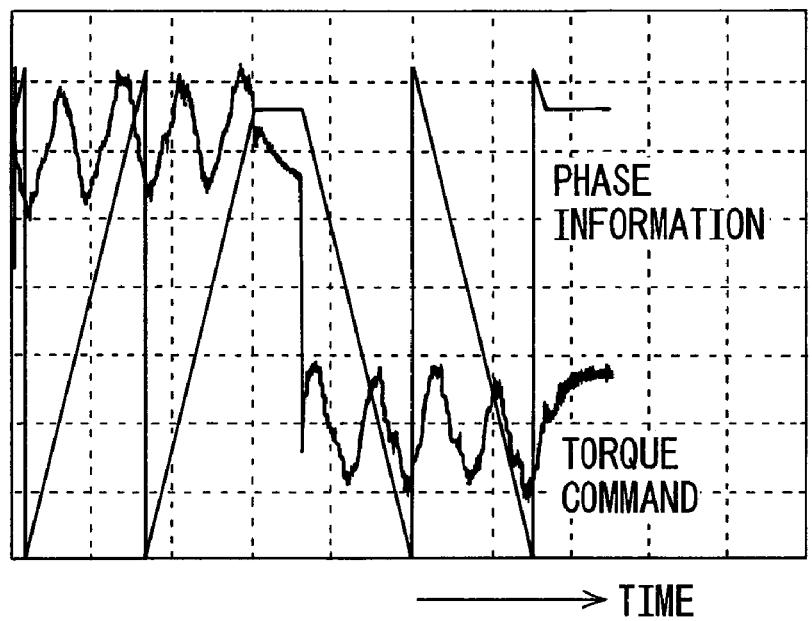
FIGS. 2A and 2B are diagrams showing torque command waveforms before and after the cogging compensation, respectively.
Figure 2B:
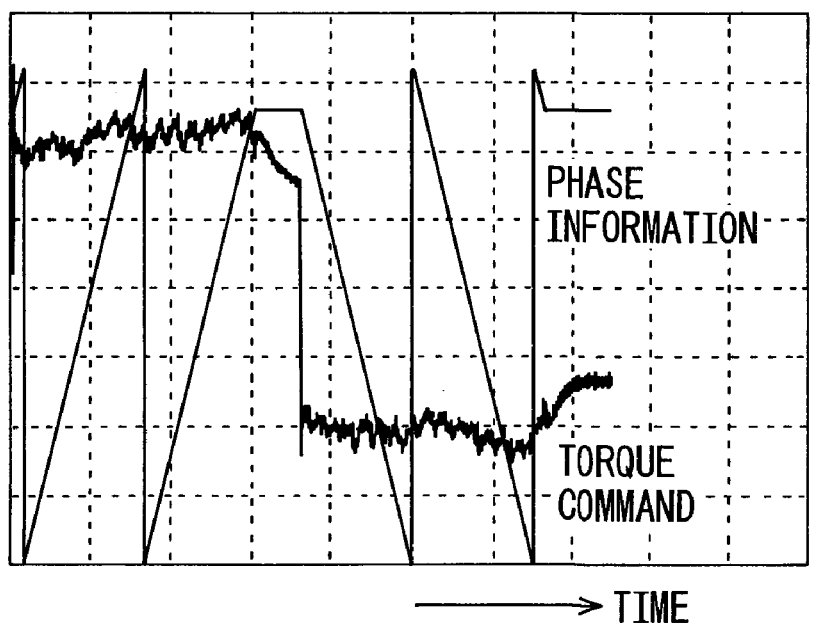

FIGS. 2A and 2B are diagrams showing torque command waveforms before and after the cogging compensation, respectively. As shown in FIG. 2A, fluctuating components due to the cogging torque are superimposed on the torque command. If the periodic fluctuation due to the cogging torque is removed, the torque command becomes flat, and the slope of the waveform in the section with the same moving direction thus becomes zero. That is, when the cogging compensation is applied, the cogging torque components are canceled out to achieve a flat torque command waveform, as illustrated in FIG. 2B.

Figure 3A:
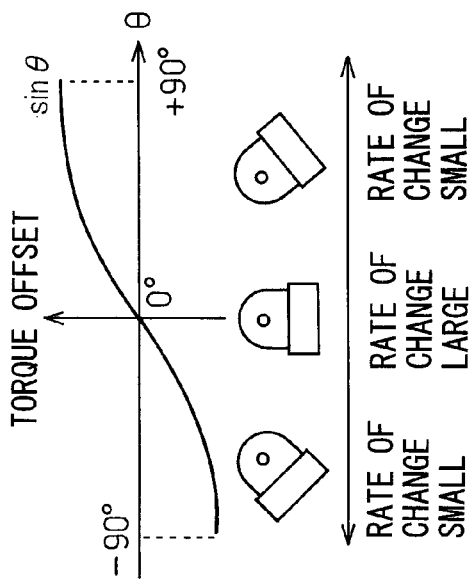
FIGS. 3A, 3B, 3C, and 3D are diagrams for explaining how the torque changes in the case of a tilted rotating axis.
Figure 3B:
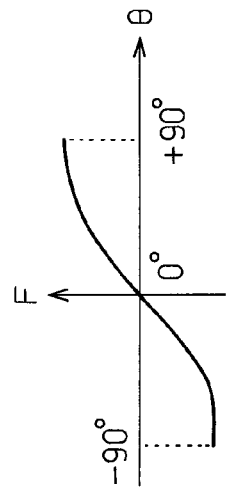
Figure 3C:
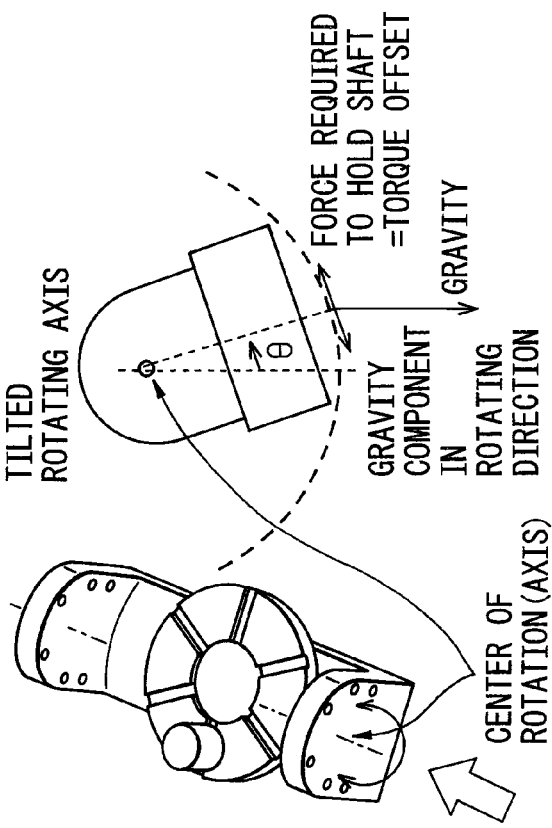
Figure 3D:
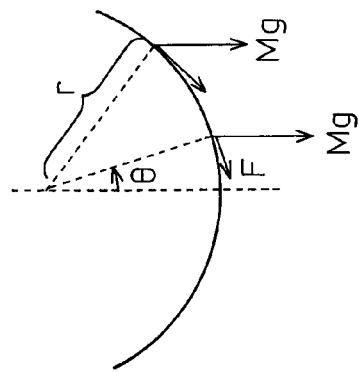

FIGS. 3A, 3B, 3C, and 3D are diagrams for explaining how the torque changes in the case of a tilted rotating axis. As earlier described, in the case of a feed axis in which the influence of gravity does not vary, the torque command being output during slow-speed feed operation is nearly constant, but in the case of an axis (tilted rotating axis) that causes a table to tilt, as shown in FIG. 3A, the influence of gravity changes according to the tilt angle. That is, the gravity component in the rotating direction varies according to the angle θ. As a result, the force required to hold the axis, i.e., the torque offset, changes according to the angle θ. More specifically, as shown in FIG. 3C, when the weight of the tilted rotating axis is denoted by M and the tilt angle by θ, the gravity is given as Mg and the force F acting on the tilted rotating axis tangentially along an arc is given as Mg sin θ. Thus, the force F changes with θ, as illustrated in FIG. 3D. Accordingly, the torque offset and the rate of change thereof can be defined as shown in FIG. 3B. As can be seen from FIG. 3B, the rate of change of the torque offset is maximum when the waveform is measured at the mechanically most stable position (near bottom dead center). As a result, in the case of a tilted rotating axis, the torque command being output during slow-speed feed operation is not constant but changes greatly according to the tilt angle. Since the torque command thus contains fluctuating components due to gravity, if frequency analysis is performed directly on the torque command, it is not possible to calculate a proper amount of cogging compensation.

Figure 4A:
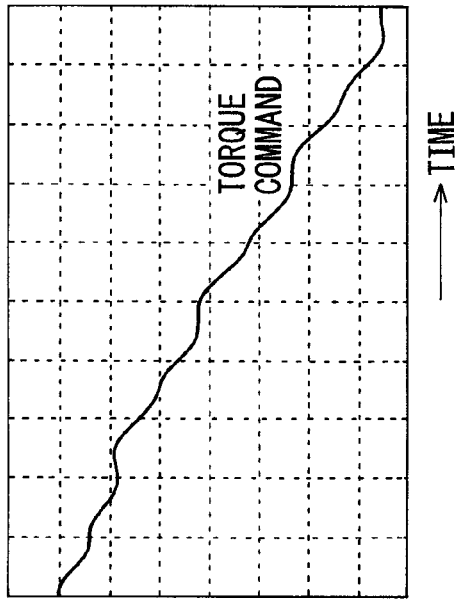
FIGS. 4A, 4B, 4C, and 4D are diagrams for explaining why cogging torque components become difficult to extract through frequency analysis when torque offset changes due to gravity.
Figure 4B:
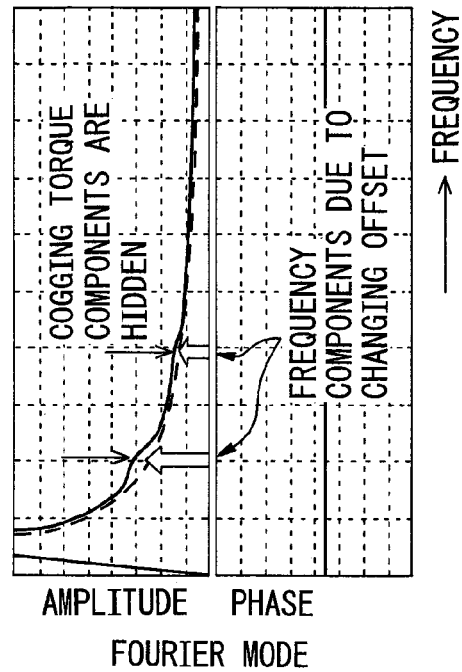
Figure 4C:
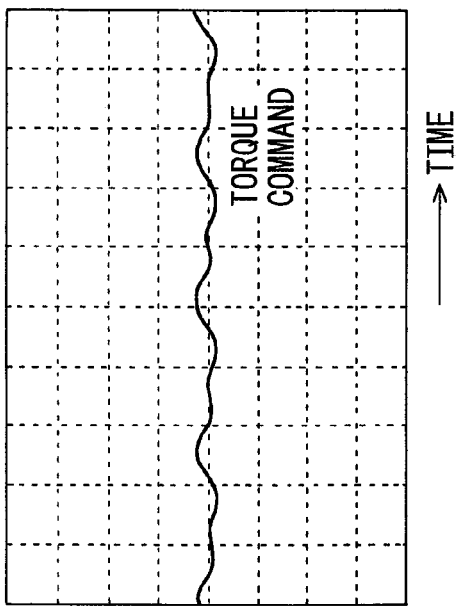
Figure 4D:
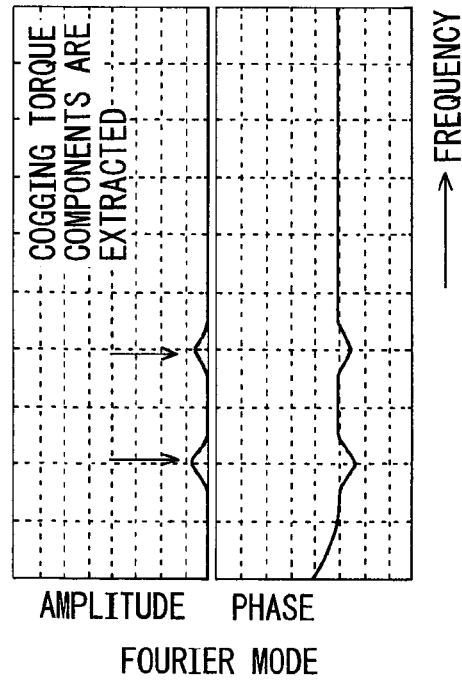

FIGS. 4A, 4B, 4C, and 4D are diagrams explaining why the cogging torque components become difficult to extract through frequency analysis when the torque offset changes due to gravity. When the influence of gravity does not vary, and the torque offset is constant, the torque command waveform is flat as shown in FIG. 4A. In this case, if the waveform in the frequency domain is obtained by Fourier transform, the increases in amplitude at specific frequencies become identifiable as illustrated in FIG. 4B, so that the cogging torque components can be extracted. On the other hand, when the influence of gravity varies, and the torque offset changes, the torque command waveform contains, for example, a monotonically decreasing component as shown in FIG. 4C. In this case, if the waveform in the frequency domain is obtained by Fourier transform, the waveform shown in FIG. 4D is obtained; that is, frequency components due to the changing offset appear in the waveform, thus hiding the cogging torque components.

Figure 5:
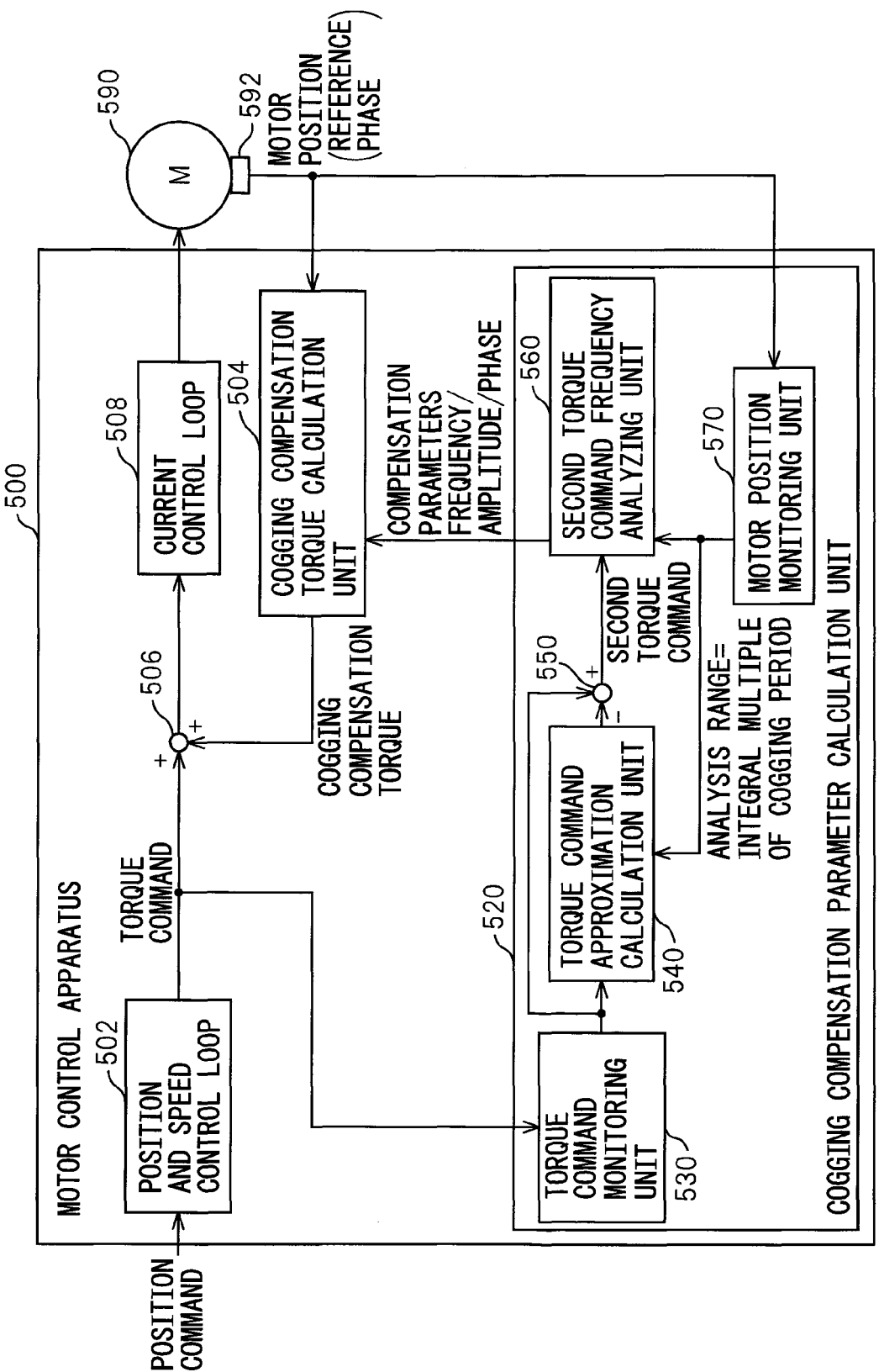
FIG. 5 is a block diagram schematically showing the configuration of a motor control apparatus according to a first embodiment of the present invention.

FIG. 5 is a block diagram schematically showing the configuration of a motor control apparatus according to a first embodiment of the present invention. In the first embodiment, components other than the cogging torque contained in the torque command being output from the speed loop controller during constant slow-speed feed operation are obtained by approximation using a low-order polynomial, and the proper amount of cogging torque compensation is calculated by performing frequency analysis on the waveform obtained by subtracting the result of the approximation from the original torque command. In FIG. 5, the motor control apparatus 500 controls a motor 590 used in a machine tool. The motor 590 is provided with an encoder 592 for detecting the motor position (reference phase).

The motor control apparatus 500 comprises a position and speed control loop 502, a cogging compensation torque calculation unit 504, an adder 506, a current control loop 508, and a cogging compensation parameter calculation unit 520.

The position and speed control loop 502 includes a position controller which calculates a speed command based on a position deviation obtained from a comparison between the feedback of the position and the position command given from a host device, and a speed controller which calculates the torque command based on a speed deviation obtained from a comparison between the feedback of the speed and the speed command. The cogging compensation torque calculation unit 504 calculates cogging compensation torque based on the compensation parameters (frequency, amplitude, and phase) supplied from the cogging compensation parameter calculation unit 520. The adder 506 outputs a corrected torque command by adding the cogging compensation torque to the torque command. The current control loop 508 calculates a drive command based on a current deviation obtained from a comparison between the feedback of the current and the current commanded by the corrected torque command, and supplies the drive command to the motor 590.

The cogging compensation parameter calculation unit 520 includes a torque command monitoring unit 530, a torque command approximation calculation unit 540, an adder 550, a second torque command frequency analyzing unit 560, and a motor position monitoring unit 570.

The torque command monitoring unit 530 monitors the torque command being output from the position and speed control loop 502 when the motor 590 is operated at a constant speed. The torque command approximation calculation unit 540 calculates a torque command approximation component by approximation from the torque command monitored by the torque command monitoring unit 530 over an interval equal to an integral multiple of the cogging torque period of the motor 590. The adder 550 calculates a second torque command by subtracting from the torque command monitored by the torque command monitoring unit 530 the torque command approximation component calculated by the torque command approximation calculation unit 540.

The second torque command frequency analyzing unit 560 extracts frequency components, each at an integral multiple of the fundamental frequency of the cogging torque, by performing frequency analysis on the second torque command calculated by the adder 550, and supplies the compensation parameters (frequency, amplitude, and phase) to the cogging compensation torque calculation unit 504. The motor position monitoring unit 570, based on the output of the encoder 592, obtains the interval equal to an integral multiple of the cogging torque period of the motor 590, and supplies it as an analysis range to the torque command approximation calculation unit 540 and the second torque command frequency analyzing unit 560.

Figure 6:
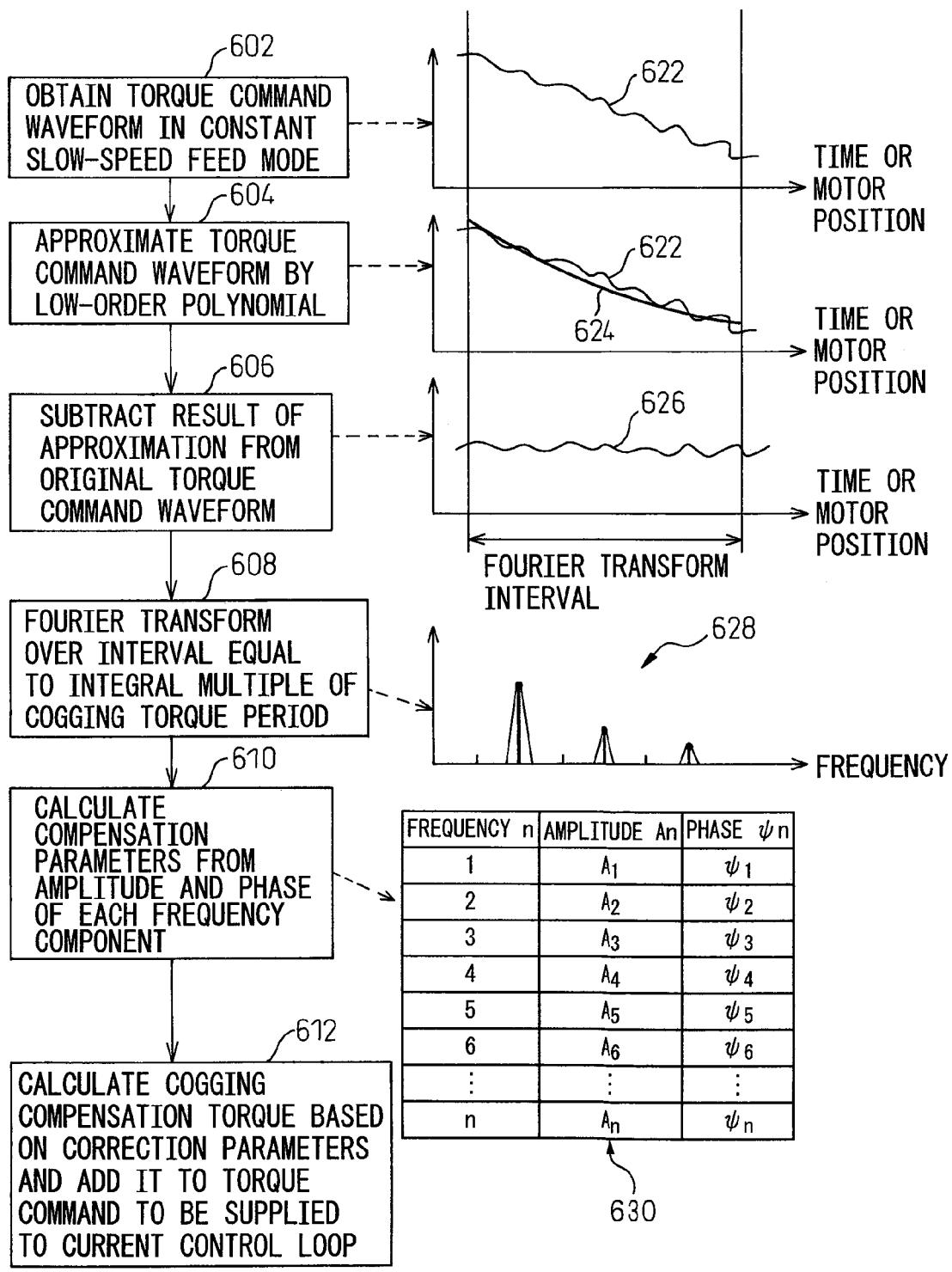
FIG. 6 is a flowchart illustrating the operation of the motor control apparatus in conjunction with accompanying table and charts.
Figure 8A:
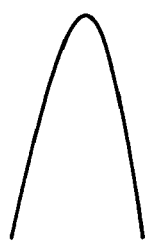
FIGS. 8A, 8B, 8C, and 8D are diagrams schematically showing the shapes of polynomials of order n.
Figure 8B:
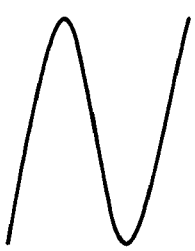
Figure 8C:
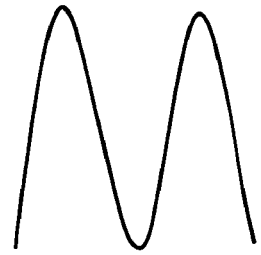
Figure 8D:
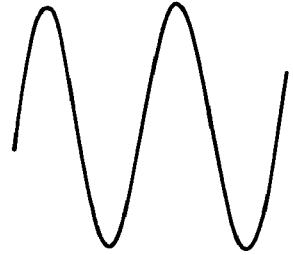

FIG. 6 is a flowchart illustrating the operation of the motor control apparatus of FIG. 5 in conjunction with accompanying table and charts. First, when the motor 590 is operating in a constant slow-speed feed mode, the torque command monitoring unit 530 obtains a torque command waveform 622 by monitoring the torque command being output from the position and speed control loop 502 (step 602).

Next, the torque command approximation calculation unit 540 obtains an approximation waveform 624 by approximating the torque command waveform 622 by a low-order polynomial (step 604). More specifically, the torque command waveform 622 is approximated by the following polynomial (1) (n is a given integer) using a least square method. Coefficients $a_0, a_1, \ldots, a_n$ in $f(x)$ are obtained as values that minimize $\Sigma\{f_0(x)-f(x)\}^2$ where $f_0(x)$ is the torque command waveform and $f(x)$ the approximation waveform.

$$f(x) = \sum_{k=0}^{n} a_k \cdot x^k = a_0 + a_1 \cdot x + a_2 \cdot x^2 + \ldots + a_n \cdot x^n \quad (1)$$

The torque command approximation calculation unit 540 performs approximation by using a polynomial whose order is less than the frequency of the motor's cogging torque. That is, the order, n, of the approximation of the torque command waveform is set smaller than the frequency of the component having the smallest frequency among the cogging components. For example, if the smallest cogging component frequency in the Fourier transform interval is 2 (4 in terms of the number of "crests" and "troughs"), then the order of the approximation is limited to 3 at maximum, as shown by the following equation (2), to prevent the cogging components from being contained in the approximation.

$$f(x) = \sum_{k=0}^{3} a_k \cdot x^k = a_0 + a_1 \cdot x + a_2 \cdot x^2 + a_3 \cdot x^3 \quad (2)$$

The above calculation example of the approximation waveform will be described in further detail with reference to FIG. 7. It is assumed here that, as shown in FIG. 7, a cogging waveform whose frequency is defined as "two times/Fourier transform interval" is contained in the torque command waveform (TCMD waveform). In this case, the cogging waveform has a shape in which a "crest", a "trough", a "crest", and a "trough" appear in this order. Generally, a polynomial of order n has a shape containing only one "crest" in the case of order 2, a "crest" and a "trough" in the case of order 3, a "crest", a "trough", and a "crest" in the case of order 4, and a "crest", a "trough", a "crest", and a "trough" in the case of order 5, as illustrated in FIGS. 8A, 8B, 8C, and 8D, respectively. Accordingly, if the approximation is performed using a high-order polynomial, the frequency of the cogging waveform will be contained in the approximation curve. In the example of FIG. 7, if a polynomial of order 5 (a "crest", a "trough", a "crest", and a "trough") is used, the number of "crests" and "troughs" will coincide with that in the cogging waveform (a "crest", a "trough", a "crest", and a "trough"). Accordingly, to prevent the cogging waveform from being contained in the approximation curve, the approximation must be performed by using a polynomial of order 4 or less; in the example of FIG. 7, a polynomial of order 3 is used for the calculation of the approximation curve.

Turning back to FIG. 6, after step 604, the adder 550 calculates the second torque command 626 using by subtracting the approximation from the original torque command waveform (step 606). The second torque command corresponds to the cogging torque components.

Next, the second torque command frequency analyzing unit 560 obtains Fourier transform results 628 by Fourier-transforming the second torque command over an interval equal to an integral multiple of the cogging torque period (step 608). Further, the second torque command frequency analyzing unit 560 extracts each frequency component of the cogging torque from the Fourier transform results 628, and calculates the compensation parameters 630 for frequency n, amplitude $A_n$, and phase $\psi_n$ (step 610).

Finally, based on the compensation parameters 630 (frequency n, amplitude $A_n$, and phase $\psi_n$), the cogging compensation torque calculation unit 504 calculates the cogging compensation torque as indicated by the following equation (3), and the adder 506 adds the cogging compensation torque to the torque command and supplies the thus corrected torque command to the current control loop 508 (step 612). In the following equation (3), $A_n$ represents the amplitude of n-times frequency component, θ the phase information (fundamental period of the cogging torque), and $\psi_n$ the phase of n-times frequency component.

$$\sum_n A_n \times \sin(n\theta + \phi_n) \ (n: 1, 2, 3, \ldots) \quad (3)$$

FIGS. 9A, 9B, and 9C are diagrams showing the original torque command waveform and the torque command waveform achieved by applying the cogging compensation according to the present invention, as compared with the torque command waveform achieved by applying the cogging compensation according to the prior art. When the cogging compensation according to the prior art is applied to the original torque command waveform shown in FIG. 9A, the torque command waveform is corrected as shown in FIG. 9B, resulting in an excessive compensation. On the other hand, when the cogging compensation according to the present invention is applied, since the proper compensation amount is calculated, the torque command waveform is corrected as shown in FIG. 9C, thus achieving proper compensation.

According to the first embodiment described above, components other than the cogging torque contained in the torque command are approximated, and the amount of cogging compensation is calculated by using the waveform obtained by removing the result of the approximation from the torque command. Here, the change in gravitational torque due to the change in attitude can be considered the largest element contributing to the components other than the cogging torque but, depending on the machine construction, there are other elements that may cause a change in force depending on the position of the machine, as described below.

- In the case of a position retaining mechanism having a spring element, the force being exerted changes due to the extension and compression of the spring element.
- The force for moving the axis changes as the cylinder of a gravity balancer extends and compresses (viscous friction+spring element).
- Due to poor parallelism with the guide, the axis becomes more difficult to move at a position toward an end than at an intermediate position.
- The axis becomes difficult to move depending on the position of the telescopic cover.

FIG. 10 is a block diagram schematically showing the configuration of a motor control apparatus 1000 according to a second embodiment of the present invention. In the second embodiment, the influence of gravity is given as a function of the motor position (i.e., the tilt angle of the table), and the amount of cogging compensation is calculated by using the waveform obtained by removing the influence of gravity from the torque command. A description will be given below of a cogging compensation parameter calculation unit 1020 which constitutes a difference from the first embodiment.

A torque command monitoring unit 1030 monitors the torque command being output from the position and speed control loop 502 when the motor 590 is caused to operate at constant speed. A motor position monitoring unit 1070 monitors the position of the motor 590 based on the output of the encoder 592. A gravitational torque calculation unit 1080 calculates a gravitational torque component at each motor position monitored by the motor position monitoring unit 1070. The calculation is made, for example, by utilizing the fact that the force F acting on a tilted rotating axis tangentially along an arc due to gravity is given as the function Mg sin θ of the angle θ, as earlier described with reference to FIG. 3C.

An adder (second torque command calculation unit) 1050 calculates the second torque command by subtracting from the torque command monitored by the torque command monitoring unit 1030 the gravitational torque component calculated by the gravitational torque calculation unit 1080. A second torque command frequency analyzing unit 1060 extracts frequency component, equal at an integral multiple of the fundamental frequency of the cogging torque, by performing frequency analysis on the second torque command calculated by the adder 1050, and supplies the compensation parameters (frequency, amplitude, and phase) to the cogging compensation torque calculation unit 504.

According to the second embodiment having the above configuration, fluctuations in the motor speed are reduced by calculating the proper amount of cogging torque compensation, as in the first embodiment, even when the gravitational torque component is superimposed on the torque command being output during constant slow-speed feed operation.

The invention may be embodied in other specific forms. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A motor control apparatus for controlling a motor used in a machine tool, comprising:
    a torque command monitoring unit configured to monitor a torque command when said motor is caused to operate at a constant speed;
    an approximation calculation unit configured to calculate a torque command approximation component by approximation from said torque command monitored by said torque command monitoring unit over an interval equal to an integral multiple of a cogging torque period of said motor;
    a second torque command calculation unit configured to calculate a second torque command by subtracting from said torque command monitored by said torque command monitoring unit said torque command approximation component calculated by said approximation calculation unit;
    a second torque command frequency analyzing unit configured to extract frequency components, each at an integral multiple of a fundamental frequency of cogging torque, by performing frequency analysis on said second torque command calculated by said second torque command calculation unit; and
    a cogging compensation amount calculation unit configured to calculate the amount of cogging compensation from the amplitude and phase of said frequency components extracted by said second torque command frequency analyzing unit.

2. A motor control apparatus as claimed in claim 1, wherein said approximation calculation unit performs said approximation by using a polynomial whose order is less than a cogging torque frequency of said motor.

3. A motor control apparatus for controlling a motor used in a machine tool, comprising:
    a torque command monitoring unit configured to monitor a torque command when said motor is caused to operate at a constant speed;

a motor position monitoring unit configured to monitor motor position;

a gravitational torque calculation unit configured to calculate a gravitational torque component at each motor position monitored by said motor position monitoring unit;

a second torque command calculation unit configured to calculate a second torque command by subtracting said gravitational torque component calculated by said gravitational torque calculation unit from said torque command monitored by said torque command monitoring unit over an interval equal to an integral multiple of a cogging torque period of said motor;

a second torque command frequency analyzing unit configured to extract frequency components, each at an integral multiple of a fundamental frequency of cogging torque, by performing frequency analysis on said second torque command calculated by said second torque command calculation unit; and a cogging compensation amount calculation unit configured to calculate the amount of cogging compensation from the amplitude and phase of said frequency components extracted by said second torque command frequency analyzing unit.

* * * * *